United States Patent Office 3,594,448
Patented July 20, 1971

---

3,594,448
FILAMENT COMPRISING A POLYMER BLEND OF POLYESTER AND POLYAMIDE CONTAINING A STERICALLY HINDERED PHENOLIC COMPOUND
Amnon Birenzvige, Gene C. Weedon, and Richard E. Mayer, Richmond, Va., assignors to Allied Chemical Corporation, New York, N.Y.
No Drawing. Filed Apr. 16, 1969, Ser. No. 816,840
Int. Cl. C08g 41/04
U.S. Cl. 260—857
16 Claims

ABSTRACT OF THE DISCLOSURE

A process for increasing the whiteness of a filament extruded from a polymer blend comprised of polyester and polyamide which comprises incorporating in the polymer blend, prior to extrusion thereof, about 0.1 to 5 weight percent, based upon the weight of the polyamide and polyester, of a sterically hindered phenolic compound and melt extruding the polymer blend to form a filament having increased whiteness.

BACKGROUND OF THE INVENTION

This invention relates to a filament having increased whiteness. More particularly, this invention relates to a process for increasing the whiteness of a filament comprising a polymer blend of polyamide and polyester using a sterically hindered phenolic compound.

Carpets and fabrics made from fibers comprising a polyamide matrix having polyester microfibers dispersed therein have generated considerable interest in the textile industry and their luxurious properties have made them desirable over carpets and fabrics made from other fibers. Unfortunately, these fibers have a possible disadvantage in that they are somewhat yellow in color as currently produced by conventional processes.

The apparel industry, for example, prefers a white fiber and pays a premium price for such a fiber; therefore, it is highly desirable for marketing and other reasons that these fibers be white.

It has now been discovered that the whiteness of a filament comprising a polymer blend of polyamide and polyester can be increased by incorporating in the polymer blend, prior to extrusion thereof, a small amount of a sterically hindered phenolic compound.

SUMMARY OF THE INVENTION

In accordance with the present invention the whiteness of a filament extruded from a polymer blend comprised of polyester and polyamide is increased by a process which comprises incorporating in the polymer blend prior to extrusion thereof a small amount of a sterically hindered phenolic compound which can be one having the general formulas:

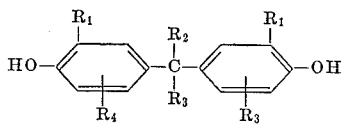

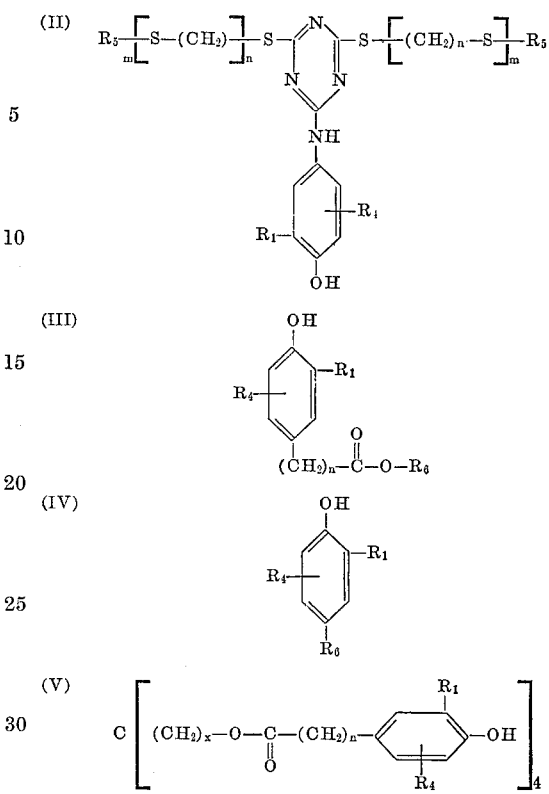

or mixtures thereof; wherein $R_1$ is a sterically hindered radical selected from the group consisting of cyclohexyl, phenyl and alkyl containing about 3 to 8 carbon atoms, which is preferably tertiary alkyl and most preferably is tertiary butyl; $R_2$ is hydrogen or a lower alkyl radical containing up to about 8 carbon atoms but preferably up to about 4 carbon atoms; $R_3$ is a lower alkyl radical containing up to about 8 carbon atoms but preferably up to about 4 carbon atoms; $R_4$ is hydrogen or a lower alkyl radical containing up to about 8 carbon atoms but preferably $R_4$ is a tertiary alkyl radical containing 4 to about 8 carbon atoms and is preferably in the ortho position to the OH radical; $R_5$ is hydrogen or an alkyl radical containing 1 to about 30, preferably about 5 to 15, carbon atoms; $R_6$ is an alkyl radical containing about 5 to 30, preferably about 15 to 20, carbon atoms; $n$ is an integer of 2 to 6; $m$ is an integer of 0 to 3; and $x$ is an integer of 1 to 3 but preferably 1 or 2; and melt extruding the polymer blend to form a filament having increased whiteness. In a preferred embodiment of the present invention the filament comprises a polyamide matrix having polyester microfibers dispersed therein.

The filaments produced in accordance with the present invention can be prepared from blends of polyester and polyamide such as disclosed in U.S. Pat. 3,369,057 to Twilley. As disclosed in Twilley, supra, the proportion of end groups of the polyamide, especially amine groups, which are reactive in the melt with the polyester should be restricted to not over 40 percent of the polyamide end groups. In addition, other blends of polyester and polyamide are satisfactory for purposes of this invention, including those disclosed in U.S. Pats. 3,378,055; 3,378,056; 3,378,602; and 3,382,305; British Pat. 1,097,068; Belgian Pat. 702,813; and Netherlands Pats. 6606838 and 6612628.

In the filaments produced in accordance with the preferred embodiment of the present invention, the polyester ingredient is dispersed as discrete microfibers throughout the polyamide which forms a continuous phase or matrix. The polyester microfibers have average diameter not above 1 micron and preferably not above 0.5 micron. In length the microfibers vary widely, but substantially all are elongated. The microfibers may be continuous or discontinuous within the matrix. On the average they are at least 5 times and usually at least 20 times longer than the average diameter, typically averaging in length about 250 times their average diameter. In the filaments, the microfibers lie predominantly in the direction of the filament axis. The dispersion of microfibers in the filament is substantially uniform, both lengthwise and across each filament. Typically at least 100 microfibers traverse each cross-section of each filament. The microfibers will generally have essentially round cross-section, although their diameter may vary along their length and they may taper toward their ends as a result of the shears imposed during drawing.

The filaments produced in accordance with the preferred embodiment of the present invention comprise, per 100 parts by weight total polyamide and polyester, about 50 to 90 parts of the polyamide as the matrix and dispersed therein about 50 to 10 parts of the polyester.

There is a large interface between the two phases of polyester and polyamide because of the very small size of the polyester microfibers dispersed in the polyamide matrix and this large interface can become important in certain instances. Among others, an interchange reaction can take place which will enhance degradation of the polymers at the interface. For some still unclear reasons, this interface may enhance the creation of free radicals. This has been shown by exposing the polyester-polyamide blend filaments to small dosages of X-ray radiation. Upon exposure of the filaments to X-rays, a pink glow appears in the filaments which fades with time. When the polyester-polyamide blend filaments are immersed in hydroquinone after exposure to X-rays, the pink glow disappears almost immediately. No such pink glow appears when polyester or polyamide filaments alone are exposed to small dosages of X-ray radiation. The presence of this pink glow is believed to be caused by the creation of free radicals. It is believed that free radicals can also be created at high temperatures during extrusion of the polyester-polyamide blend filaments or during fusion of the fabric produced therefrom. The presence of a hindered phenolic compound of the present invention is believed to prevent further degradation caused by free radical reactions and thereby increases the whiteness of the filaments.

Suitable polyamides for use in the present invention include, for example, those prepared by condensation of hexamethylene diamine and adipic acid, condensation of hexamethylene diamine and sebacic acid known as nylon 6,6 and nylon 6,10, respectively, condensation of bis(para-aminocyclohexyl) methane and azelaic acid, condensation of bis(para-aminocyclohexyl)methane and dodecanedioic acid, or by polymerization of 6-caprolactam, 7-aminoheptanoic acid, 8-caprylactam, 9-aminopelargonic acid, 11-aminoundecanoic acid, and 12-dodecalactam, known as nylon 6, nylon 7, nylon 8, nylon 9, nylon 11, and nylon 12, respectively.

The polyesters useful in the practice of this invention can be prepared in general by condensation reactions between dicarboxylic acids or their derivatives and compounds containing two hydroxyl groups, or materials possessing both an alcohol group and a carboxylic acid group or derivative thereof; or by the condensation-polymerization of lactones. Dicarboxylic acid derivatives which can be employed include esters, salts, anhydrides and acid halides. The monomeric species employed in the preparation of the polyesters are preferably not more highly functional than difunctional in their reactivity so as to produce essentially linear, non-crosslinked polymer structures.

Suitable polyesters for use in the present invention include those polymers in which one of the recurring units in the polyester chain is the diacylaromatic radical from terephthalic acid, isophthalic acid, 5-t-butylisophthalic acid, a naphthalene dicarboxylic acid such as naphthalene 2,6 and 2,7 dicarboxylic acids, a diphenyldicarboxylic acid, a diphenyl ether dicarboxylic acid, a diphenyl alkylene dicarboxylic acid, a diphenyl sulphone dicarboxylic acid, an azo dibenzoic acid, a pyridine dicarboxylic acid, a quinoline dicarboxylic acid, and analogous aromatic species including the sulfonic acid analogues; diacyl radicals containing cyclopentane or cyclohexane rings between the acyl groups; and such radicals substituted in the ring, for example, by alkyl or halo substituents.

The dioxy radical representing the other principal recurring unit in the polyester chain can be an open chain aliphatic such as ethylene glycol or ether thereof, for example, the diether, or can contain rings such as those which form part of the above noted diacyl radicals. The carboxy and/or the oxy chain members can be directly attached to a ring or removed by one or more carbons therefrom, as in the 1,4 dioxymethyl cyclohexane radical. Suitable polyesters for use in the present invention include, for example, polyethylene isophthalate and polyethylene 2,6 naphthalene dicarboxylate. The preferred polyester for use in this invention is polyethylene terephthalate.

The sterically hindered phenolic compounds used in this invention are well-known compounds. The phenolic group is sterically hindered by the presence of at least one alkyl substituent on the ring ortho to the phenolic group. Alkyl groups of from about 3 to 8 carbon atoms are effective. Tertiary alkyl groups are preferred.

Representative sterically hindered phenolic compounds suitable for use in this invention are:

1,1 bis(2-methyl-4-hydroxy-5-tert-butylphenyl)butane;
2,2 bis(2-methyl-4-hydroxy-5-tert-butylphenyl)pentane;
1,1 bis(2methyl-4-hydroxy-5-tert-butylphenyl)propane;
2,2 bis (2-methyl-4-hydroxy-5-tert-butylphenyl)butane;
1,1 bis(3-methyl-4-hydroxy-5-tert-butylphenyl)butane;
1,1 bis(3,5-di-tert-butyl-4-hydroxyphenyl)butane;
1,1 bis[2-methyl-4-hydroxy-5-(1,1 dimethyl propyl) phenyl]butane;
2(4-hydroxy-3,5-di-tert-butyl anilino)-4,6-bis(n-octylthio)1,3,5 triazine;
2(4-hydroxy-3,5-di-tert-butyl anilino)-4,6-bis(n-nonoylthio)1,3,5 triazine;
2(4-hydroxy-3,5-di-tert-butyl anilino)-4,6-bis(n-heptylthio)1,3,5 triazine;
2(4-hydroxy-3-tert-butyl-5-isopropylanilino)-4,6-bis(n-octylthio)1,3,5 triazine;
2[4-hydroxy-3-tert-butyl-5-(1,1-dimethylpropyl)anilino] 4,6-bis(n-octylthio)1,3,5 triazine;
octadecyl 3(3,5-di-tert-butyl-4-hydroxyphenyl) propionate;
eiconyl 3(3,5-di-tert-butyl-4-hydroxyphenyl)propionate;
pentadecyl 3-(3,5-di-tert-butyl-4-hydroxyphenyl) propionate;
octadecyl 3[3(1,1-dimethylpropyl)-5-tert-butyl-4-hydroxyphenyl]propionate;
octadecyl 4-(3,5-di-tert-butyl-4-hydroxyphenyl) butyrate;
2,6 di-tert-butyl-4-octadecylphenol;
2-tert-butyl-4-octadecyl-6-(1,1 dimethylpropyl)-phenol;
2,6 di-tert-butyl-4-eiconylphenol; and
2,6 di-tert-butyl-4-heptadecylphenol.

Generally speaking, about 0.1 to 5 weight percent of the sterically hindered phenolic compound, based upon the weight of the polyamide and polyester, will produce the desired whitening of the filament; however, it is preferred that about 0.1 to 1 weight percent be used. The sterically hindered phenolic compound can be incorporated into either the polyamide or polyester or both during the respective polymerization or can be dry blended with the polyamine and polyester granules prior to the melting of the blend of polymers by conventional addition and dry mixing procedures. The sterically hindered phenolic compound can also be incorporated into the molten blend of polymer by, for example, injection into the mixing portion of the extruder prior to the melt extrusion of the filament.

The filament produced in accordance with the present invention can be processed into conventional knitted, woven, or non-woven fabric. If desired, the filaments comprising these fabrics can be fused together in accordance with the method described in U.S. application Ser. No. 727,327, filed May 7, 1968, to produce dimensionally stable fabrics which retain their original fabric-like appearance.

Several systems are suitable for heat treating the fabric, as for example, a forced air oven with a nitrogen purge, a static draft oven without nitrogen, heated match-die molds, a molding press or a steam autoclave. The method of heating has been found to be of little consequence.

For any given fabric, the temperature and time will vary depending on the ratio of polymeric materials, article size, shape, desired rigidity, mode of heat application and other variables. In general, it is necessary to apply heat without excessive degradation of sufficient intensity and duration at least as high as the melting point of the nylon matrix until the fabric yarns have fused to each other yet still retain the yarn or farbic identity. If the fabric yarns are spun from staple fibers, the fibers forming the yarn will fuse together individually in addition to fusion at the cross points of the farbics. Fusion can be achieved without undesirable flow; it is this phenomenon which permits the process to provide unique dimensional stability and appearance to textile materials and, therefore, regulates the minimum and maximum heat-set conditions. Thus, the fabric interstices are practically unaltered by the fusion as described herein since there is no polymer flow or migration, provided the dimensions of the fabric are maintained.

Thus, while no empirical or mathematical formula has been found for determining the minimum heat-setting conditions to fuse the filaments of the present invention, appearance after heating, and in particular, after fusion and removal of the nylon by formic acid has been found to be an important criterion.

The discovery has been made that an unusual fusion characteristic exists in the structure formed by the dispersed fibrils which unexpectedly are bonded together even though the melt temperature thereof has not been reached during the heat-set operation. The appearance of this fused microfibrillar dispersion can be evaluated as a reliable index of the degree of fusion.

The optimum fusion temperature for a nylon-polyester combination containing 30 parts by weight of polyethylene terephthalate microfibers dispersed in 70 parts by weight of polycaproamide (nylon 6), is about 240° C. for efficient fusion, fiber integrity retention, coloration, and controllable hand and texture suitable for treatment. Naturally the time for fusion is dependent on many factors, including the amount of polyester dispersed in the polyamide matrix, the filament or yarn size fabric construction, that is, knit, weave, loose, tight, etc. and, of course, the ultimate texture desired in the fabric. Thus, time periods are determined by the mass to be heated and the type of heat source employed. For example, when employing an oven, durations as short as about 15–20 seconds at about 230° C. have been found effective for at least partial fusion when a softer fabric is desired. Fusion times of up to about 10 minutes and longer at about 255° C. can be employed, however, the breaking strength of the fabric is reduced somewhat.

To summarize, for 70 denier yarn, 10 to 300 seconds in a dry oven at 240° C. appears to be the optimum fusion conditions where substantially complete fusion is obtained, as determined by removing the nylon with formic acid to determine if the remaining polyester has maintained a true fabric appearance, being cohesive and elastic.

PREFERRED EMBODIMENTS

The following examples illustrate the practice and principles of the present invention and a mode of carrying out the invention.

EXAMPLE 1

Synthetic multifilament yarns were produced in accordance with the procedure used in Example 1 of U.S. Pat. 3,369,057 to Twilley. Granular polyethylene terephthalate polymer was used, melting about 255° C. (DTA) and about 265° C. (optical), having a density (when amorphous) of about 1.33 grams per cc. at 23° C. and about 1.38 grams per cc. in the form of drawn filament, having a reduced viscosity of about 0.85 in ortho-chlorophenol and having a $T_G$ of about 65° C. The polyester in the form of drawn filament, when drawn to give ultimate elongation not above 20 percent, will have a tensile modulus (modulus of elasticity) ranging from about 70 to about 140 grams per denier, depending on the extrusion conditions employed.

Mixtures were prepared comprising 30 parts of granular polyester mixed with 70 parts of granular nylon 6 (polycaproamide) having a reduced viscosity of about 1.04 in 90 percent formic acid, a $T_G$ of about 35° C., and a density of about 1.14 grams per cc. at 23° C. The amine groups in the nylon 6 (polycaproamide) were blocked by reaction with sebacic acid, bringing the amine group analyses thereof to 11 milliequivalents of $NH_2$ groups per kilogram of polymer. The nylon 6 (polycaproamide) contained, as a heat stabilizer, 50 p.p.m. copper as cupric acetate. The sterically hindered phenolic compounds listed in Table I below were separately dry blended with the above mixtures of polyamide and polyester granules in an amount of 0.5 weight percent sterically hindered phenolic compound, based on the weight of the polyester and polyamide.

The mixtures of polyamide and polyester granules and the sterically hindered phenolic compound were each blended in a double cone blender for one hour. The granular blends were dried to a moisture content of no more than 0.01 percent; then melted at 285° C. in a 3½ inch diameter screw extruder operated at a rotational speed of about 39 r.p.m. to produce a pressure of 3000 p.s.i.g. at the outlet. A dry nitrogen atmosphere was used to protect the blends against absorbing moisture. Residence time in the extruder was 8 minutes.

The molten mixtures thereby obtained had melt viscosities of about 2000 poises at 285° C. The polyester was uniformly dispersed throughout each mixture and had an average particle diameter of about 2 microns, as observed by cooling and solidifying a sample of the melt, leaching out the polyamide component with formic acid, and examining the residual polyester material.

The molten mixtures thereby obtained were extruded through a spinnerette plate having 14 orifices of circular cross-section, and the resulting fibers were drawn and wound, the final yarn deniers generally being about 70. The polyethylene terephthalate microfibers had an average diameter not above 1 micron and had an average length at least 20 times their average diameter. The microfibers lay predominantly in the direction of the filament axis. Each of the yarns containing a sterically hindered phenolic compound was white whereas the control yarn containing no sterically hindered phenolic compound was very yellow. The yarns containing a sterically hindered phenolic compound had an average Yellow Index[1] of about 112 whereas the control yarn containing no sterically hindered phenolic compound had a Yellow Index[1] of 123.

TABLE I

Sterically hindered phenolic compounds (A) 2,6-di-tert-butyl-4-octadecyl phenol
(B) 2(4-hydroxy-3,5-di-tert-butylanilino)-4,6 bis(n-octylthio)1,3,5 triazine
(C) tetrakis[3,5 - di-tert-butyl-4-hydroxyhydrocinnamoyloxymethylene]methane
(D) octadecyl 3 - (3,5-di-tert-butyl-4-hydroxyphenyl)propionate
(E) 1,1 bis(5-tert-butyl - 4 - hydroxy-2-methylphenyl)butane

EXAMPLE 2

The synthetic multifilament yarn produced in Example 1 containing sterically hindered phenolic compound C as listed in Table I and a control yarn, containing no sterically hindered phenolic compound, produced in the same manner were woven into plain weave fabrics having 19 picks per inch in both the warp and fill directions. The yarns each contained 14 filaments and were drawn at a draw ratio of about 3× to a final denier of about 70. Twelve ends of each yarn were plied to obtain plied yarns of about 840 denier prior to weaving. The fabrics were bonded by fusing them on a tenter frame at 30 percent overfeed for 3 minutes at 250° C. in accordance with the method described in U.S. application Ser. No. 727,327, filed May 7, 1968. The fused fabric containing the sterically hindered compound was only yellowed whereas the control containing no sterically hindered phenolic compound was brown. Results are contained in Table II below.

TABLE II

|  | Control | Sterically hindered phenolic compound |
|---|---|---|
| Wt. percent based on total polyester and polyamide | None | 0.5 |
| Denier | 70 | 70 |
| Visual appearance | (1) | (2) |
| Yellow index [3] | 138 | 127 |

[1] Brown.  [2] Yellowed.  [3] See Example 1.

The fused fabrics produced above were dimensionally stable and retained their original fabric-like appearance.

[1] Measured on a Reflectance Colorimeter. The reflectance was measured at 420, 530 and 576 millimicrons. The Yellow Index was then calculated in a conventional manner common to the art. A Yellow Index of 100 is considered to be pure white.

It is claimed:

1. A process for increasing the whiteness of a filament extruded from a polymer blend comprised of a fiber-forming polyester and a fiber-forming polyamide, said polymer blend comprising, per 100 parts by weight total polyamide and polyester, about 50 to 90 parts of polyamide having dispersed therein about 50 to 10 parts of polyester, which comprises incorporating in the polymer blend, prior to extrusion thereof, about 0.1 to 5 weight percent, based upon the weight of the polyamide and polyester, of a sterically hindered phenolic compound selected from the group having the general formulas:

(I)

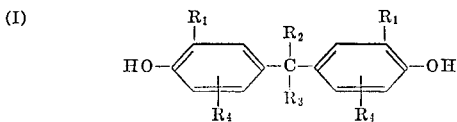

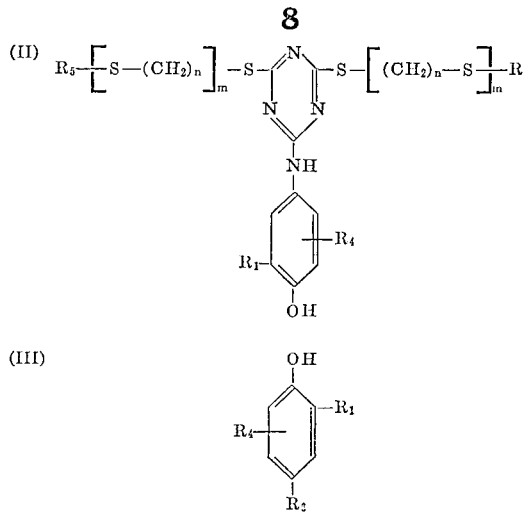

and mixtures thereof; wherein $R_1$ is a sterically hindered radical selected from the group consisting of cyclohexyl, phenyl, and alkyl containing about 3 to 8 carbon atoms; $R_2$ is selected from the group consisting of hydrogen and a lower alkyl radical containing up to about 8 carbon atoms; $R_3$ is a lower alkyl radical containing up to about 8 carbon atoms; $R_4$ is selected from the group consisting of hydrogen and a lower alkyl radical containing up to about 8 carbon atoms; $R_5$ is selected from the group consisting of hydrogen and an alkyl radical containing 1 to about 30 carbon atoms; $R_6$ is an alkyl radical containing about 5 to 30 carbon atoms; $n$ is an integer of 2 to 6; $m$ is an integer of 0 to 3; and melt extruding the polymer blend to form a filament having increased whiteness.

2. The process of claim 19 wherein the filament comprises a polyamide matrix having polyester microfibers dispersed therein.

3. The process of claim 2 wherein $R_1$ is a tertiary alkyl radical containing 4 to about 8 carbon atoms, $R_5$ is an alkyl radical containing about 5 to 15 carbon atoms and $R_6$ is an alkyl radical containing about 15 to 20 carbon atoms.

4. The process of claim 3 wherein the sterically hindered phenolic compound is selected from the group consisting of 2,6-di-tert-butyl-4-octadecylphenol; 1,1 bis (5 - tert-butyl-4-hydroxy-2-methylphenyl)butane; 2(4-hydroxy - 3,5 - di - tert-butylanilino)-4,6 bis(n-octylthio) 1,3,5 triazine; tetrakis[3,5(di-tert-butyl-4-hydroxyhydrocinnamoyloxymethylene]methane; and octadecyl 3-(3,5-di-tert-butyl-4-hydroxyphenyl)propionate.

5. The process of claim 3 wherein the amount of sterically hindered phenolic compound incorporated into the polymer blend is about 0.1 to 1.0 weight percent based upon the weight of the polyamide and polyester.

6. The process of claim 2 wherein the polyamide is polycaproamide and the polyester is polyethylene terephthalate.

7. The process of claim 2 wherein the sterically hindered phenolic compound is dry blended with polyamide and polyester granules.

8. The process of claim 2 wherein the sterically hindered phenolic compound is incorporated into a molten polymer blend comprised of polyester and polyamide.

9. The process of claim 2 wherein the sterically hindered phenolic compound is incorporated into one of said polymers during polymerization of said polymer.

10. A filament having increased whiteness comprising a polymer blend of a fiber-forming polyester and a fiber-forming polyamide, said polymer blend comprising, per 100 parts by weight total polyamide and polyester, about 50–90 parts of polyamide having dispersed therein about 50 to 10 parts of polyester, containing about 0.1 to 5 weight percent, based upon the weight of the polyamide and polyester, of a sterically hindered phenolic compound selected from the group having the general formulas:

(II)
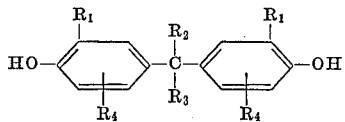

(II)
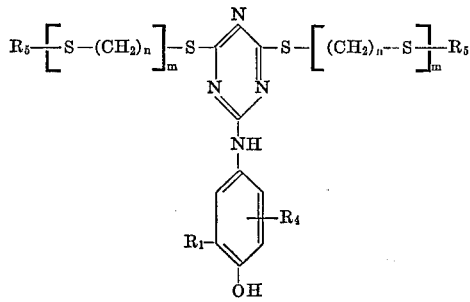

(III)
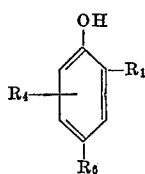

and mixtures thereof; wherein $R_1$ is a sterically hindered radical selected from the group consisting of cyclohexyl, phenyl, and alkyl containing about 3 to 8 carbon atoms; $R_2$ is selected from the group consisting of hydrogen and a lower alkyl radical containing up to about 8 carbon atoms; $R_3$ is a lower alkyl radical containing up to about 8 carbon atoms; $R_4$ is selected from the group consisting of hydrogen and a lower alkyl radical containing up to about 8 carbon atoms; $R_5$ is selected from the group consisting of hydrogen and an alkyl radical containing 1 to about 30 carbon atoms; $R_6$ is an alkyl radical containing about 5 to 30 carbon atoms; $n$ is an integer of 2 to 6; and $m$ is an integer of 0 to 3.

11. The filament of claim 10 wherein the filament comprises a polyamide matrix having polyester microfibers dispersed therein.

12. The filament of claim 11 wherein $R_1$ is a tertiary alkyl radical containing 4 to about 8 carbon atoms, $R_5$ is an alkyl radical containing about 5 to 15 carbon atoms and $R_6$ is an alkyl radical containing about 15 to 20 carbon atoms.

13. The filament of claim 12 wherein the sterically hindered phenolic compound is selected from the group consisting of 2,6-di-tert-butyl-4-octadecylphenol; 1,1 bis (5-tert-butyl-4-hydroxy-2-methylphenyl)butane; 2(4 - hydroxy-3,5-di-tert-butylanilino) - 4,6 bis(n-octylthio)1,3,5 triazine; tetrakis[3,5(di-tert-butyl - 4 - hydroxyhydrocinnamoyloxymethylene]methane; and octadecyl 3-(3,5-di-tert-butyl-4-hydroxyphenyl)propionate.

14. The filament of claim 11 wherein the amount of sterically hindered phenolic compound contained in the filament is about 0.1 to 1.0 weight percent based upon the weight of the polyamide and polyester.

15. The filament of claim 11 wherein the polyamide is polycaproamide and the polyester is polyethylene terephthalate.

16. A fabric constructed from the filaments of claim 11 wherein said filaments comprising the fabric are fused together to produce a dimensionally stable fabric whereby the original fabric-like appearance is retained and the fabric has increased whiteness.

References Cited

UNITED STATES PATENTS

| | | | |
|---|---|---|---|
| 3,285,855 | 11/1966 | Dexter | 260—45.85 |
| 3,330,859 | 7/1967 | Dexter | 260—45.85 |
| 3,369,057 | 2/1968 | Twilley | 260—857 |

FOREIGN PATENTS

| | | | |
|---|---|---|---|
| 423,097 | 11/1967 | Japan | 260—45.85 |

PAUL LIEBERMAN, Primary Examiner

U.S. Cl. X.R.

260—45.8N, 45.85R, 45.95R, 75R, 78R, 78.3R